(12) United States Patent
Rosenfeld

(10) Patent No.: US 10,743,055 B2
(45) Date of Patent: Aug. 11, 2020

(54) AUTOMATED PROGRAM RECORDING

(71) Applicant: Cable Television Laboratories, Inc., Louisville, CO (US)

(72) Inventor: Eric Rosenfeld, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/121,172

(22) Filed: Sep. 4, 2018

(65) Prior Publication Data

US 2018/0376189 A1 Dec. 27, 2018

Related U.S. Application Data

(63) Continuation of application No. 15/442,786, filed on Feb. 27, 2017, now Pat. No. 10,070,169, which is a
(Continued)

(51) Int. Cl.
| | |
|---|---|
| *H04N 5/782* | (2006.01) |
| *H04N 21/2747* | (2011.01) |
| *H04N 5/445* | (2011.01) |
| *H04N 7/173* | (2011.01) |
| *H04N 21/235* | (2011.01) |
| *H04N 21/258* | (2011.01) |
| *H04N 21/4147* | (2011.01) |
| *H04N 21/433* | (2011.01) |
| *H04N 21/435* | (2011.01) |
| *H04N 21/442* | (2011.01) |
| *H04N 21/472* | (2011.01) |
| *H04N 21/6543* | (2011.01) |
| *H04N 21/84* | (2011.01) |
| *H04N 21/2385* | (2011.01) |
| *H04N 21/643* | (2011.01) |

(Continued)

(52) U.S. Cl.
CPC ..... *H04N 21/2747* (2013.01); *H04N 5/44543* (2013.01); *H04N 5/782* (2013.01); *H04N 7/173* (2013.01); *H04N 21/235* (2013.01); *H04N 21/2385* (2013.01); *H04N 21/25891* (2013.01); *H04N 21/4147* (2013.01); *H04N 21/435* (2013.01); *H04N 21/4334* (2013.01); *H04N 21/44222* (2013.01); *H04N 21/47214* (2013.01); *H04N 21/47217* (2013.01); *H04N 21/64322* (2013.01); *H04N 21/6543* (2013.01); *H04N 21/6587* (2013.01); *H04N 21/812* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 9,077,947 | B2 | 7/2015 | Merzon et al. |
| 9,392,209 | B1 | 7/2016 | kotab |

(Continued)

*Primary Examiner* — Eileen M Adams
(74) *Attorney, Agent, or Firm* — Great Lakes Intellectual Property, PLLC

(57) ABSTRACT

A method and system of providing access to television programs without requiring a user to operate an electronic programming guide or to independently determine information required to access the television program. Optionally, access to the television program may be facilitated by scheduling a recording of the televisions program or providing instructions to facilitate accessing an on-demand showing of the television program.

20 Claims, 2 Drawing Sheets

Related U.S. Application Data continuation of application No. 12/493,483, filed on Jun. 29, 2009, now Pat. No. 9,584,754.

(51) Int. Cl.
*H04N 21/6587* (2011.01)
*H04N 21/81* (2011.01)

(56) References Cited

U.S. PATENT DOCUMENTS

| | | |
|---|---|---|
| 9,402,064 B1 | 7/2016 | kotab |
| 2002/0124250 A1 | 9/2002 | proehl |
| 2005/0204385 A1* | 9/2005 | Sull ............ G11B 27/034 725/45 |
| 2005/0268324 A1* | 12/2005 | An ............ H04L 29/06027 725/152 |
| 2008/0005505 A1 | 1/2008 | maegawa |
| 2008/0235726 A1 | 9/2008 | Sakao et al. |
| 2008/0256218 A1 | 10/2008 | Kinoshita |
| 2009/0007183 A1* | 1/2009 | Kizuka ............ H04N 5/76 725/58 |
| 2009/0158349 A1 | 6/2009 | Song |
| 2009/0172141 A1* | 7/2009 | Iwami ............ G06F 16/489 709/223 |
| 2010/0061709 A1 | 3/2010 | davender |
| 2010/0135639 A1 | 6/2010 | Ellis et al. |
| 2015/0026728 A1 | 1/2015 | Carter et al. |

\* cited by examiner

AUTOMATED PROGRAM RECORDING

CROSS-REFERENCE TO RELATED APPLICATIONS

This application is a continuation of U.S. application Ser. No. 15/442,786 filed Feb. 27, 2017, now U.S. Pat. No. 10,070,169, which in turn is a continuation of U.S. application Ser. No. 12/493,483 filed Jun. 29, 2009, now U.S. Pat. No. 9,854,754, the benefits and disclosures of which are incorporated in their entireties by reference herein.

TECHNICAL FIELD

The present invention relates to automated program recording of the type wherein scheduling instructions are relied upon by a recording device to schedule a future program recording.

BACKGROUND

Digital video recorders (DVRs) are one type of personal video recorder (PVR) commonly used to record programs. An electronic programming guide (EPG) or other application, operating either on the DVR or another device, such as a settop box (STB), can be used to facilitate scheduling DVR recordings. The guides include navigable user interfaces, typically partitioned into a grid arrangement where each program is identified according to time and channel. A user can search through the interfaces to find a program of interest, and if necessary, select an option to record the program.

The guide includes recording information necessary for the DVR to schedule a recording of the selected program, such as the channel showing the program and the time period for which the channel is to be recorded. The guides have a limited date range of information in that they are unable to identify programs occurring beyond some point in the future, typically a couple of weeks. This can be problematic if a user desires to record a program that is not included within the guide, such as a new program that is not currently scheduled into the guide.

Some guides include a user directed option where the user is able to manually schedule a recording of the program by entering the necessary recording information. This process, however, requires the user to execute a number of operations and to have knowledge of the time period and channel to be recorded. If the time period and channel of the program is not known to the user or is not yet scheduled by a service provider for broadcast, the user is unable to manually schedule the recording.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
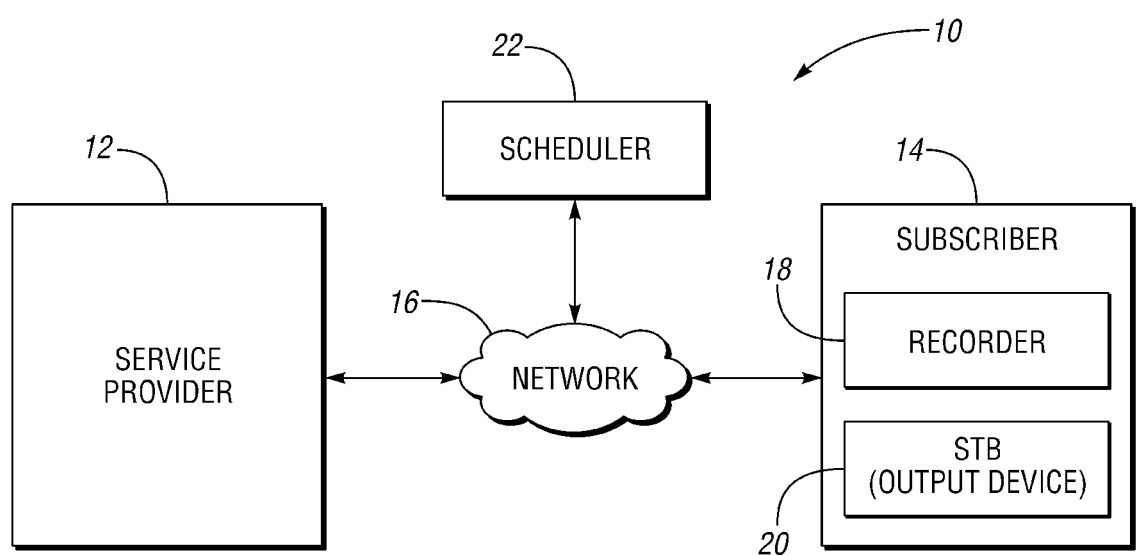
FIG. 1 illustrates a system for supporting automated recording in accordance with one non-limiting aspect of the present invention.

FIG. 1 illustrates a system 10 for supporting automated recording in accordance with one non-limiting aspect of the present invention. The system 10 is shown for exemplary purpose as being adapted for use in a television environment where a service provider 12 electronically delivers television signals to a subscriber 14 over a network 16. The subscriber 16 may include a recorder 18 and output device 20 to facilitate processing and recording of the television signals.

The system 10 is predominately described with respect to the service provider utilizing the television signal to support television program transmission, such as through linear and/or non-linear unicast and/or broadcast transmissions. The television signals may be descrambled or otherwise processed by the output device 20, such as but not limited to a settop box (STB), for output to a television or other display (not shown). The recorder 18 may be a digital video recorder (DVR) or other type of personal video recorder (PVR) having capabilities for recording the television signals for user-directed playback on the output device.

For exemplary purposes, the system 10 is described with respect to facilitating automated scheduling of programs to be recorded on the recorder 18. This is done for exemplary purposes only and without intending to limit the scope and contemplation of the present invention. The present invention fully contemplates facilitating automated scheduling for any type of recording, and not just television based program recording. Moreover, the present invention is not intended to be limited to recording locally on the recorder 18 and fully contemplates scheduling off-site or remote recordings at other locations. The playback of the scheduled recordings is not limited to playback on the local output device and may be coordinated and/or supported on a mobile phone or at another location besides that of subscriber.

The automated program recording contemplated by one non-limiting aspect of the present invention relies on data carried within a transport stream, such as but not limited to extended data service (XDS) data, segment identifiers used to individual identify the multiple segments comprising each program, such as those carried within a data layer of an MPEG transport stream, and other data available with Internet Protocol (IP) or other data packets having capabilities sufficient to facilitate transmission of the television programs. The data carried with the television program transmission may be considered to be in-band (IB) data in that it is carried along with the content of the television program when the program is transmitted from the service provider, as opposed to out-of-band (OOB) data which is transmitted separately from the content transmission. In this manner, one non-limiting aspect of the present invention may rely on IB data to facilitate scheduling the recorder.

The present invention contemplates scheduling the recording without relying on electronic programming guide (EPG) data or other data typically transmitted to the recorder 18 or output device 20 to support applications/guides and other user interactive features that users may navigate to locate available content. This allows the present invention to schedule recordings beyond the date range limits of EPG and DVR recording guides by including the recording information needed to schedule the recording within the television signal transmission and/or by including an identifier that can be used to request or look-up any additional information not carried within the television signal transmission that may be required by the recorder 18 to scheduled the recording.

The system 10 may include a recording scheduler 22 to facilitate generation of the scheduling information required by the recorder 18 to record a desired program. The scheduler 22 may operate in cooperation with the service provider to either provide the necessary data to the service provider to embed with transmission of the television programs and/or the scheduler 22 may be an entity separate from the service provider having capabilities sufficient to support embedding the data in accordance with the operations contemplated by the present invention. The scheduler 22 may include any information necessary for the recorder 18 to schedule a recording, such as but not limited to information on the channel assigned to carry the program, the duration for which the program is to be recorded, and in some case, the frequency at which the program is to be recorded (some programs may be repeatedly recorded, such as if the program relates to a television series.)

Figure 2:
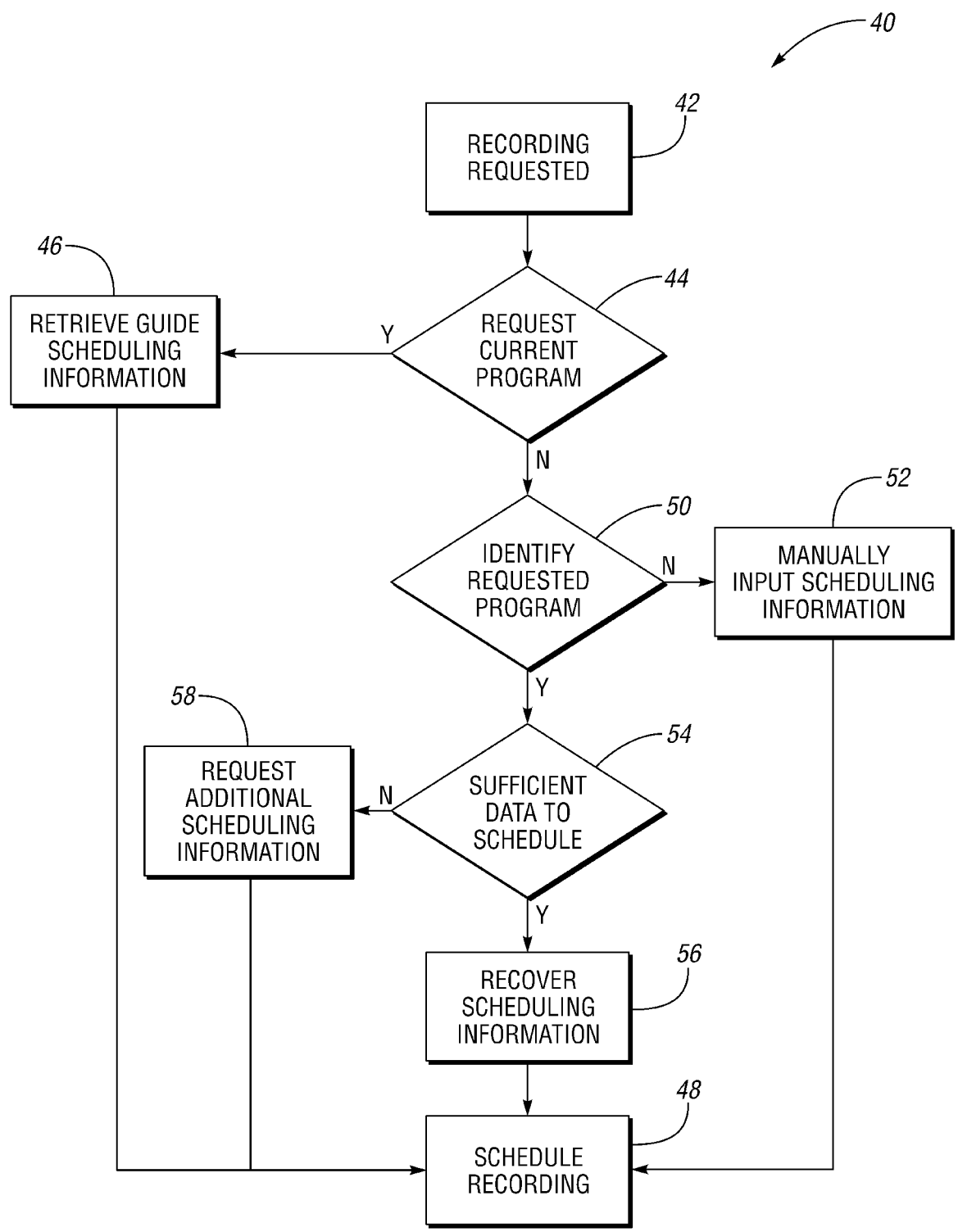
FIG. 2 illustrates a flowchart of a method of automated program recording in accordance with one non-limiting aspect of the present invention.

FIG. 2 illustrates a flowchart 40 of a method of automated program recording in accordance with one non-limiting aspect of the present invention. The method may be implemented with the assistance of a computer-readable medium and/or with the assistance of any number of logical processing elements used within any environment applicable to the present invention, such as with the assistance of the above described scheduler 22, output device 20, and/or recorder 18 operating in accordance with instructions stored on the computer-readable medium. Each of the operations described below need not necessarily be executed or executed in the described order as variations may be made in accordance with the scope and contemplation of the present invention.

Block 42 relates to determining a recording request. The recording request may be determined by a user pressing a record button included on a remote control for controlling the output device 20 and/or the recorder 18 or by responding to a prompt shown during viewing of a program, such as but not limited to a prompt that is triggered with a pop-up icon/advertisement and/or through interaction with a guide or other navigable user interface. The user may also initiate the recording request by calling the service provider, communication an email/text message, or taking other action not necessarily executed through interaction with the output device or recorder.

Block 44 relates to determining whether the recording request is for a current program. The current program can be classified as a program having recording information already available to the output device and/or recorder through a guide application, such as an EPG or other the like. A request for the current program may correspond with recording requests made for programs having scheduling information that is already actively being transmitted through OOB messaging. One non-limiting aspect of the present invention contemplates triggering a recording without requiring the user to navigate an EPG or recording guide by simply pressing a record button on a remote control.

The program desired for recording may be inferred to be the currently tuned-to program or a program currently being output by the output device 20. Optionally, the inference of the program desired for recording need not necessary correspond with the currently tuned-to program. An assessment can be made of the content showing within the tuned-to program to facilitate identifying the program actually desired for recording. If a commercial is showing, for example, to advertise an upcoming program, such as for a program due out well out into the future (beyond the data range of the EPG or recorder guide), it may be inferred that the recording request is initiated for the advertised message and not the currently tuned-to program.

Optionally, during playback of the commercial or while another item of interest is being shown, a message may appear, such as a pop-up icon, to prompt the user with a recording requests. The icon may appear for a brief period of time, during which the user can request recording of the program shown in the icon by simply pressing an input of the remote control, after which the icon may automatically disappear. The icon may also be displayed until the user inputs a responsive reply either accepting or denying the recording.

The recording request is, therefore, analyzed with respect to the commercials and/or icons showing while the request is received and/or those that have recently been shown to assess whether the request relates to a currently tuned-to program, a program having locally available scheduling information, or an upcoming program. Block 46 is reached if the program relates to the currently tuned-to program or a program where the scheduling information needed by the recorder 18 is retrieved from an EPG guide, recorder guide, or other data already having the scheduling information required by the recorder 18 to schedule the desired recording. Once the necessary scheduling information is retrieved, it is transmitted or otherwise communicated in Block 48 to the record to schedule the recording.

If program request for recording is not for the currently tuned-to program or a program for which the related scheduling information is available locally in one of the guides, Block 50 is reached to identify the program desired for recording. This may include cross-reference the time of day or program elapse time corresponding with receipt of the recording request with the current tuned-to channel number to identify a commercial, icon, or other event showing proximate in time to the request. Data embedded within the currently tune-to program may also be used to facilitate identifying the program desired for recording. For example, a segment corresponding with an advertisement for the upcoming program may include data within a segment identifier that can be used as reference ID for the upcoming program.

If the program cannot be identified, Block 52 is reached to request the user to manual input scheduling information for the request recording, such as if there is insufficient data included within the tuned-to program to automatically identify the to be recorded program. This may require the user to have some knowledge of the channel being used to carry the program and time period during which the channel must be recorded in order to facilitate scheduling the recording in Block 48. If, however, there is sufficient data available to identify the program subject to the recording request, Block 54 is reached.

Block 54 determines whether the embedded data sufficient to schedule the recoding or whether additional scheduling data required. One non-limiting aspect of the present invention contemplates embedding all the scheduling information needed by the recorder 18 to schedule the recording within the IB data being transmitted with the currently tuned-to program. This may include embedding the data within a data layer of an MPEG transport stream used to transport the currently tuned to program such that it can be recovered by the output device or recorder 18 in Block 56 and transmitted to the recorder 18 in Block 18 to schedule the recording.

If the embedded data is unable to provide all the necessary scheduling information, Block 58 is reached and a request for the scheduling information is made by the output device 20 to the scheduler 22 and/or service provider 12 for the missing information. One non-limiting aspect of the present invention contemplates simply embedding a reference ID or other ID within the currently tuned-to program stream to identifying the program desired for recording. This ID can be recovered from the stream and transmitted to the scheduler 22 to identify the program. The scheduler 22 can cross-reference the reference ID with the stored scheduling information to identify the scheduling information required by the recorder 18. Optionally, different scheduling instructions may be stored for the same program depending on the scheduling demands/requirements of the recorder performing the recording.

The scheduler may communicate the scheduling information back to the output device 20 and/or directly to the recorder 18, either through IB or OOB messaging, to schedule the recording in Block 48. In this manner, Block 48 can be reached to schedule a future recording according to local scheduling information (Block 46), manually inputted scheduling information (Block 52), scheduling based on information embedded within the tuned-to program (Block 56), and/or scheduling information transmitted from the scheduler (Block 58). With respect to the last two options, the program scheduled for recording is automatically identified and the scheduling information is automatically retrieved while the user is tuned-to another program and watching a commercial or other event shown within that program.

As supported above, one non-limiting aspect of the present invention relates to a system to enable creation of a DVR program event based on a commercial, even when the DVR does not have any knowledge of the event (e.g., if the program is outside the boundary of the DVR's program guide) or to update a favorites file of a user profile to mark a program for future recording/access. This may include the described mechanism for scheduling the recording of an event based on a commercial, whether it falls inside our outside the program guide window.

When a commercial for a TV program is inserted into a broadcast stream, information about the program can be embedded in the stream (using eXtended Data Service—XDS—in the analog or digital stream). If a user sees the commercial and wants to watch the program, they can instruct the DVR to create a timer or reminder for that program. This timer or reminder can still be set up even if the program falls outside of the window of program guide information. At least three methods may be used to schedule the recoding:

1) Reliance on enough information about the program being embedded in the commercial. This may include embedding the date, time, channel, and number of programs (e.g., in the case of a special series). The DVR can read this information directly from the analog or digital stream, and set up a timer or reminder.

2) A unique identifier can be embedded in the commercial. This identifier can then be used by the DVR to look up the program information using an IP connection or some other mechanism for two-way communication between a server and the DVR. This identifier can be created using a unique number generator, a hash function, or some other mechanism that will ensure it is unique. Based on the information the DVR receives, it can then schedule a timer or reminder. This may help in the event a commercial is broadcast over satellite, over-the-air, or cable. Because channel line-ups vary from one operator to the other, a single piece of information can be used by all DVRs regardless of the service provider.

3) A combination of #1 and #2—where the stream may contain some information, but perhaps not enough to properly schedule the recoding. In such an event, the DVR can still look up the information it needs to create a timer or reminder.

This system can solve the DVRs being restricted in their ability to respond to what users want to do, especially when those needs are based on shows they are watching. Adding the capabilities suggested by the present invention would make a DVR much easier to use, and may provide an incentive for users to watch commercials because they can easily spot shows they want to watch. It can also inform users if they don't have access to the TV station—providing the opportunity to upsell customers in the event they see programs they want to watch. If information can be embedded in the stream, then there is no need for additional equipment or signaling. It applies equally to broadcast, satellite or cable distribution of video programming.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for facilitating media recording at a server comprising:

embedding recording instructions for recording a second media within a first stream being used to stream a plurality of first Internet Protocol (IP) packets to a device to facilitate display of a first media encoded therein, the recording instructions identifying an address and a time needed for the server to generate a recording of a transmission of the second media.

2. The method of claim 1 further comprising generating the recording at the server in response to receiving a recording request from the device, the recording request including the address and the time identified by the device from the embedded recording instructions.

3. The method of claim 2 further comprising transmitting the recording to the device following a completion of the recording at the server.

4. The method of claim 3 further comprising transmitting the recording from the server as a second stream having a plurality of second IP packets.

5. The method of claim 4 further comprising transmitting a recording message from the server to the device with an IP address for the device to use in requesting on-demand transmission of the second stream from the server.

6. The method of claim 4 further comprising transmitting a recording message from the server to the device with a Uniform Resource Locator (URL) for the device to access the second stream on-demand from the server.

7. The method of claim 4 further comprising transmitting a recording message from the server to the device with a reference ID for the device to use in requesting transmission of the second stream from the server.

8. The method of claim 4 further comprising:
the first stream rendering the first media as a webpage on the device; and
the second stream rendering the second media as a program.

9. The method of claim 8 further comprising the server transmitting the second stream as a Movie Pictures Expert Group (MPEG) stream.

10. The method of claim 4 further comprising:
the first stream rendering the first media as an advertisement on the device shown during display of a first program; and
the second stream rendering the second media as a second program.

11. The method of claim 10 further comprising:
the first stream being transmitted to the device as a Movie Pictures Expert Group (MPEG) stream; and
embedding the recording instructions within a data layer of the MPEG stream.

12. A method for scheduling off-site recording of a program prior to transmission of the program from a service provider, the method comprising:
embedding recording instructions for a program within signaling used to interface a first media to a user of a device, the recording instructions specifying a time and an address needed for generating a recording of the first program; and
generating a recording of the program at a server operating off-site from the device in response to receiving a recording request communicated from the device while the user interfaces with the first media, the recoding request including the recording instructions as recovered by the device from the signaling.

13. The method of claim 12 further comprising the first media being used by the device to interface another program with the user having an advertisement for the program.

14. The method of claim 12 further comprising the first media being used by the device to interface a webpage with the user having an advertisement for the program.

15. The method of claim 12 further comprising transmitting a recording message from the server to the device after completing the recording, the recording message including access instructions sufficient for the device to access the recording from the server.

16. The method of claim 15 further comprising providing the access instructions to include a Uniform Resource Locator (URL) for the device to stream the recording from the server on-demand.

17. The method of claim 15 further comprising providing the access instructions to include an Internet Protocol (IP) address for the device to address an access message to request on-demand download of the recording from the server.

18. The method of claim 12 further comprising embedding the recording instructions within a plurality of Internet Protocol (IP) packets transmitted as part of the signaling.

19. The method of claim 12 further comprising:
the signaling being transmitted to the device as a Movie Pictures Expert Group (MPEG) stream; and
embedding the recording instructions within a data layer of the MPEG stream.

20. A system for recording programs available from a service provider, the system comprising:
a scheduler for embedding recording instructions for a program available from the service provider within signaling interfaced with a user through a device used to display media having an advertisement for the program, the recording instructions specifying an address and a time for recording a transmission of the program from the service provider, the recording instructions being previously unknown to the device prior to receipt of the signaling; and
a server off-site from the device for generating a recording of the program in response to receiving a recording request from the device while the user interfaces with the signaling, the recoding request including the recording instructions as recovered by the device from the signaling.

* * * * *